US006809907B1

(12) United States Patent
Vigna et al.

(10) Patent No.: US 6,809,907 B1
(45) Date of Patent: Oct. 26, 2004

(54) REMOTE-OPERATED INTEGRATED MICROACTUATOR, IN PARTICULAR FOR A READ/WRITE TRANSDUCER OF HARD DISKS

(75) Inventors: Benedetto Vigna, Potenza (IT); Sarah Zerbini, Fontanellato (IT); Simone Sassolini, Sansepolcro (IT); Carlo Menescardi, Vittuone (IT)

(73) Assignee: STMicroelectronics S.r.l, Agrate Brianza (IT)

(*) Notice: Subject to any disclaimer, the term of this patent is extended or adjusted under 35 U.S.C. 154(b) by 0 days.

(21) Appl. No.: 09/357,442

(22) Filed: Jul. 20, 1999

(30) Foreign Application Priority Data

Jul. 30, 1998 (EP) .............................. 98830464

(51) Int. Cl.[7] .............................. G11B 21/14; G11B 5/48
(52) U.S. Cl. .................................. 360/294.3; 360/294.6
(58) Field of Search ......................... 360/294.1–294.7, 360/264.5, 246.7, 78.05

(56) References Cited

U.S. PATENT DOCUMENTS

| | | | |
|---|---|---|---|
| 3,789,378 A | 1/1974 | Bonzano et al. | 340/174.1 |
| 4,065,677 A | 12/1977 | Micheron et al. | 307/112 |
| 5,025,346 A | 6/1991 | Tang et al. | 361/283 |
| 5,151,763 A | 9/1992 | Marek et al. | 357/26 |
| 5,216,631 A | 6/1993 | Sliwa, Jr. | 365/174 |
| 5,233,213 A | 8/1993 | Marek | 257/415 |
| 5,428,259 A | 6/1995 | Suzuki | 310/309 |
| 5,438,469 A | 8/1995 | Rudi | 360/109 |
| 5,477,097 A | 12/1995 | Matsumoto | 310/309 |
| 5,521,778 A | 5/1996 | Boutaghou et al. | 360/106 |
| 5,631,514 A | 5/1997 | Garcia et al. | 310/309 |
| 5,657,188 A | 8/1997 | Jurgenson et al. | 360/106 |
| 5,995,334 A | * 11/1999 | Fan et al. | 360/294.3 |

FOREIGN PATENT DOCUMENTS

| | | |
|---|---|---|
| EP | 0 482 205 A1 | 4/1992 |
| EP | 0 533 095 A2 | 3/1993 |
| EP | 0 578 228 A3 | 1/1994 |
| EP | 0 578 228 A2 | 1/1994 |
| EP | 0 613 124 A2 | 8/1994 |
| EP | 0 840 291 A2 | 5/1998 |
| JP | 07-177773 | 7/1995 |
| WO | WO 93/21536 | 10/1993 |
| WO | WO 95/34943 | 12/1995 |

OTHER PUBLICATIONS

Tang et al., "Laterally Driven Polysilicon Resonant Microstructures," *Sensors and Actuators*. (20):25–32, Nov. 15, 1989.

(List continued on next page.)

*Primary Examiner*—Brian E. Miller
(74) *Attorney, Agent, or Firm*—Lisa K. Jorgenson; Robert Iannucci; Seed IP Law Group PLLC

(57) ABSTRACT

A microactuator comprises a motor element including a stator and a rotor capacitively coupled to the stator; an actuator element having a circular structure; and a transmission structure interposed between the motor element and the actuator element to transmit a rotary movement of the motor element into a corresponding rotary movement of the actuator element. In particular, the transmission structure comprises a pair of transmission arms identical to each other, arranged symmetrically with respect to a symmetry axis of the microactuator. The transmission arms extend between two approximately diametrically opposed regions of the rotor to diametrically opposed regions of the actuator element.

26 Claims, 7 Drawing Sheets

OTHER PUBLICATIONS

Starr, "Squeeze–Film Damping in Solid State Accelerometers," *IEEE Solid–State Sensor an Actuator Workshop*, pp. 44–47, Jun. 1990.

Gianchandani et al., "Batch Fabrication and Assembly of Micromotor–Driven Mechanisms With Multi–Level Linkages," *Micro Electro Mechanical Systems*, IEEE, pp. 141–146, 1992.

Lee et al., "Polysilicon Micro Vibromotors," *Micro Electro Mechanical Systems*, IEEE, pp. 177–182, Feb. 4–7, 1992.

Fujita et al., "Position Control of An Electrostatic Linear Actuator Using Rolling Motion," *Mechatronics*, vol. 2, No. 5, pp. 495–502, Oct. 1992.

Zhang et al., "Viscous Air Damping in Laterally Driven Microresonators," *IEEE Workshop No. 7*, pp. 199–204, Jan. 25, 1994.

Fan et al., "Magnetic Recording Head Positioning at Very High Track Densities Using a Microactuator–Based, Two–Stage Servo System," *Transactions on Industrial Electronics*, IEEE, 42(3):222–233, Jun. 1995.

Moesner et al, "Electrostatic Devices For Particle Micro–Handling," IEEE, pp. 1302–1309, 1995.

Imamura et al., "Transverse Mode Electrostatic Microactuator For MEMS–Based HDD Slider," *IEEE*, pp. 216–221, 1996.

Horsley et al., "Angular Micropositioner For Disk Drives," *IEEE MEMS '97 Workshop* Nagoya, Japan.

Veijola et al., "Mode for Gas Film Damping in a Silicon Accelerometer," 1997 *International Conference on Solid–State Sensors and Actuators*, pp. 1097–1100, Jun. 16–19, 1997.

Pannu et al., "Accelerometer Feedforward Servo For Disk Drives." Presented at the *Advanced Intelligent Mechatronics–International Conference*, Tokyo, Japan, Jun. 1997.

Aggarwal, "Design and Control of Micro–Actuators For High Density Disk Drives," *Thesis Graduate Division—University of California at Berkeley*, May 1997.

Aggarwal et al., "Micro–Actuators For High Density Disk Drives," *American Control Conference*, 1997.

Peter Mee et al, "Only Clean Drives Are Good Drives," *Data Storage*, pp. 77–80, Sep. 1997.

* cited by examiner

REMOTE-OPERATED INTEGRATED MICROACTUATOR, IN PARTICULAR FOR A READ/WRITE TRANSDUCER OF HARD DISKS

TECHNICAL FIELD

The present invention relates to a remote-operated integrated microactuator. In particular, an integrated microactuator according to the present invention may be advantageously, but not exclusively, used to actuate read/write transducers of hard disks.

BACKGROUND OF THE INVENTION

As is known, hard disk actuating devices having a dual actuation stage recently have been proposed for fine control of a position of a read/write head with respect to a hard disk to be read or written. FIGS. 1 and 2 schematically show an example of a known hard disk actuating device 1 with a dual actuation stage. Shown in detail in FIG. 1, the hard disk actuation device 1 comprises a motor 2 (also called "voice coil motor")to which at least one suspension 5 formed by a lamina is fixed in projecting manner. At its free end, the suspension 5 has an R/W (read/write) transducer 6 (see FIG. 2) (also called a "slider")disposed when in an operative condition to face a surface of a hard disk 7 (see FIG. 1). The R/W transducer 6 is rigidly connected to a coupling (called a "gimbal" 8), via a microactuator 9 interposed between the gimbal 8 and the R/W transducer 6. On one of its lateral surfaces, the RIW transducer 6, formed by a ceramic material body (e.g., AITiC), further has a read/write head 10 (which is magneto/resistive and inductive) that forms the read/write device proper.

In the actuating device 1, a first actuation stage is formed by the motor 2 that moves a unit including the suspension 5 and the R/W transducer 6 across the hard disk 7 during track seeking. A second actuation stage is formed by the microactuator 9 that finely controls the position of the R/W transducer 6 during tracking.

An embodiment of a microactuator 9 of a rotary electrostatic type is shown in diagrammatic form in FIG. 3, with the microactuator 9 shown only in part, given its axial symmetry. The microactuator 9 comprises a stator 17, which is integral with a die accommodating the microactuator 9 and bonded to the gimbal 8, and a rotor 11, intended to be bonded to the R/W transducer 6 and capacitively coupled to the stator 17.

The rotor 11 comprises a suspended mass 12 of substantially circular shape and a plurality of movable arms 13 extending radially towards the outside from the suspended mass 12. Each movable arm 13 has a plurality of movable electrodes 14 extending in a substantially circumferential direction and spaced at a same distance from each other. The rotor 11 further comprises anchoring and elastic suspension elements (shown as springs 15 in FIG. 3) for supporting and biasing of the rotor 11 through fixed regions 16.

The stator 17 comprises a plurality of fixed arms 18a, 18b extending radially inward and each bearing a plurality of fixed electrodes 19. In particular, associated with each movable arm 13 is a pair of fixed arms formed by a fixed arm 18a and a fixed arm 18b. Fixed electrodes 19 of each pair of fixed arms 18a, 18b extend towards an associated movable arm 13 and are intercalated or interleaved with the movable electrodes 14. The fixed arms 18a are all disposed on a same side of the respective movable arms 13 (on the right side in the example shown in FIG. 3) and are all polarized at a same potential via biasing regions 20a. Similarly the fixed arms 18b are all disposed on the other side of the respective movable arms 13 (on the left side in the example shown in FIG. 3) and are all biased at a same potential through biasing regions 20b. The fixed arms 18a and 18b are biased at different potentials to generate two different potential differences with respect to the movable arms 13 and cause the rotor 11 to rotate in one direction or the other. The known arrangement shown in FIG. 2 does, however, have several disadvantages. The microactuator 9 is subject to intense mechanical stresses due to impacts of the RIW transducer 6 against the hard disk 7 that may damage the microactuator 9. Furthermore, the microactuator 9 is exposed to an external environment, and therefore is not protected from extraneous particles present in the environment that may compromise its satisfactory operation. Also, biasing voltages supplied to the microactuator 9 to obtain desired movements of the R/W transducer 6 have relatively high values (of the order of 80 V) which may cause electrostatic interference in the direction of the R/W transducer 6.

SUMMARY OF THE INVENTION

An advantage of the present invention is to provide an integrated microactuator which overcomes the disadvantages of the proposed microactuators described above.

Embodiments of the invention provide an integrated microactuator comprising a motor element, the motor element including a stator element and a rotor element coupled reciprocally thereto. The integrated microactuator further comprises a separate actuator element and a transmission structure interposed between the motor element and the actuator element to transmit a movement of the motor element into a corresponding movement of the actuator element.

BRIEF DESCRIPTION OF THE DRAWINGS

For an understanding of the present invention, a number of preferred embodiments will now be described, purely by way of non-exhaustive and non-limiting examples, with reference to the accompanying drawings.

In the drawings, like reference numerals refer to like parts throughout the various views unless otherwise indicated.

DETAILED DESCRIPTION OF THE ILLUSTRATED EMBODIMENTS

Figure 1:
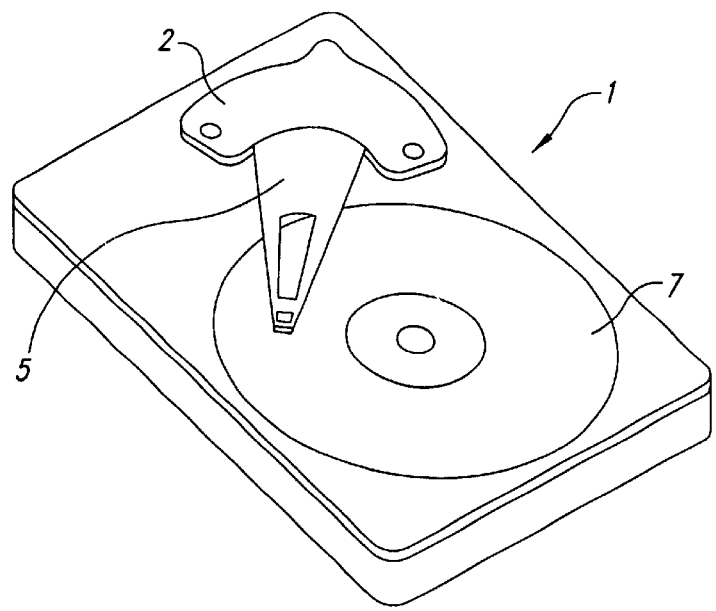
FIG. 1 is a perspective view of a known type of actuating device for hard disks.
Figure 2:
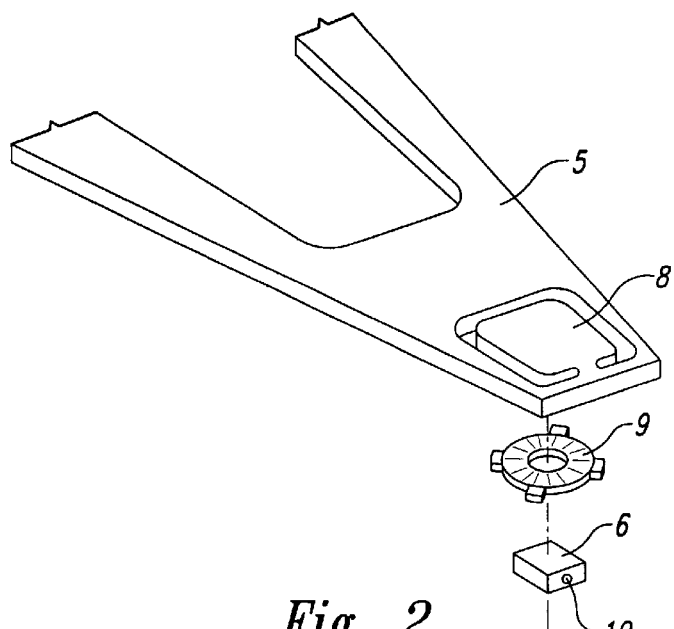
FIG. 2 is an exploded view of a micrometric actuation assembly of the actuating device of FIG.1.
Figure 3:
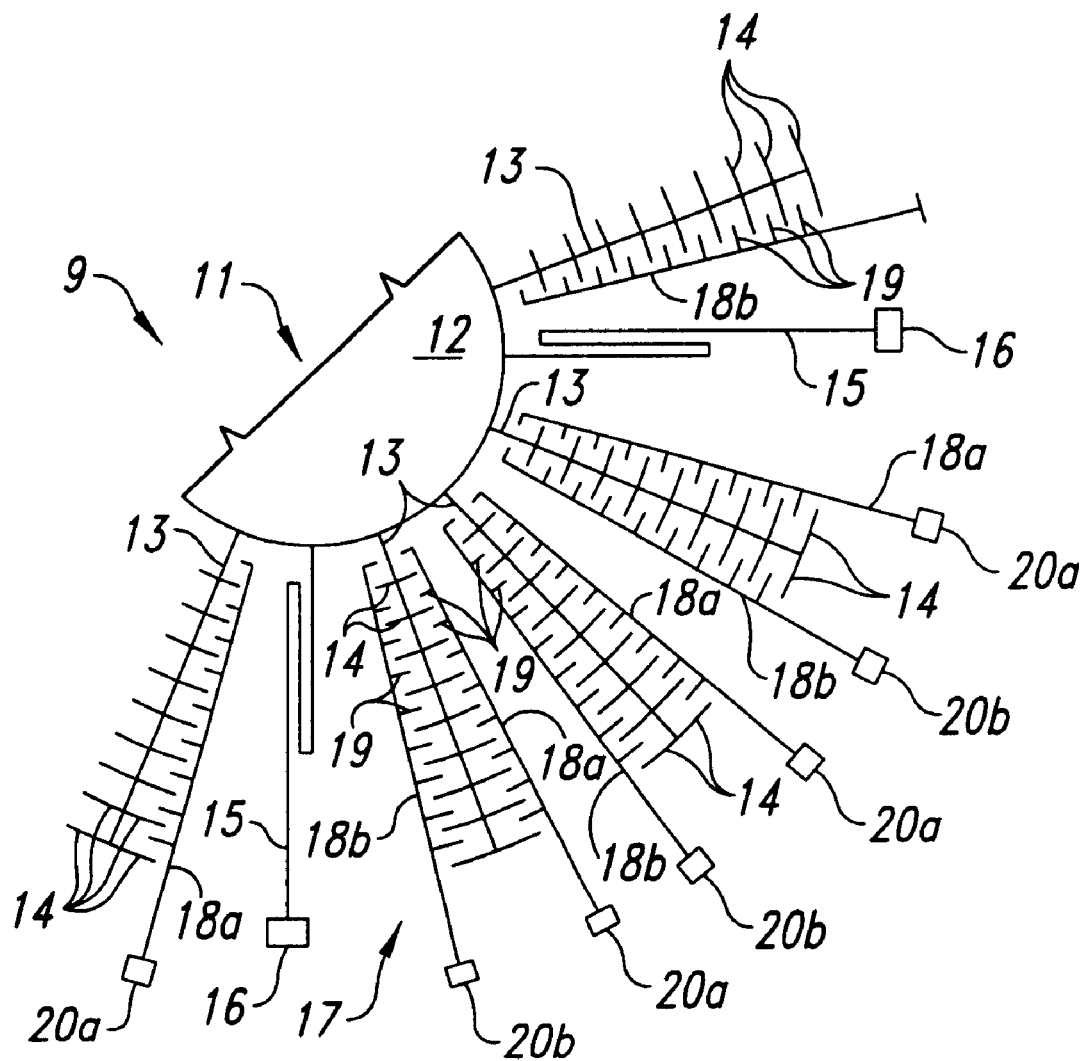
FIG. 3 is a schematic view of an integrated microactuator of a known type.
Figure 4:
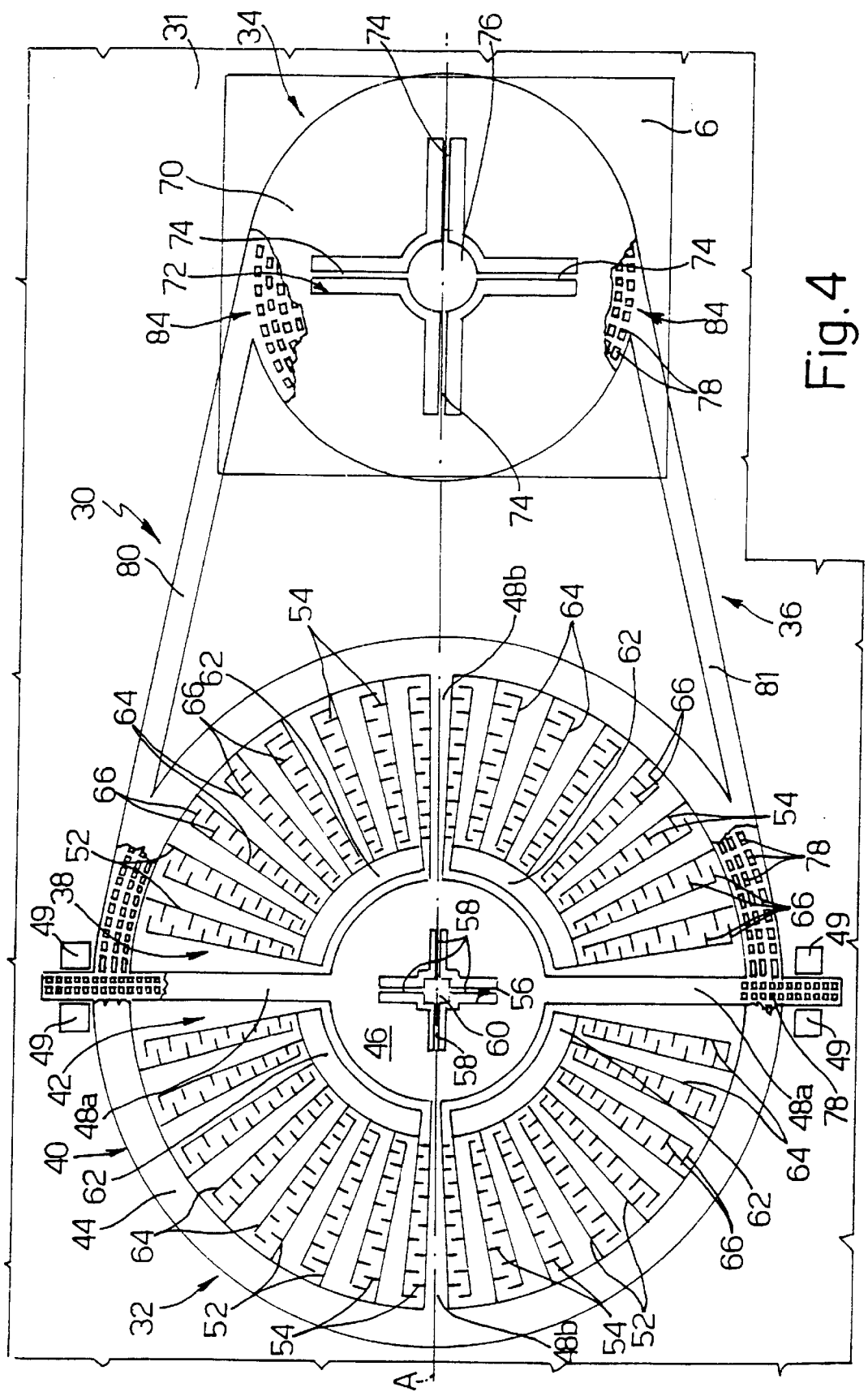
FIG. 4 is a schematic view of an integrated microactuator according to a first embodiment of the present invention.

In FIG. 4, a microactuator is indicated as a whole at 30 and is integrated in a die 31 intended to be rigidly connected to the gimbal 8 (see, e.g., FIG. 2). The microactuator 30 comprises a motor element 32 of a rotary type; an actuator element 34 separated from the motor element 32 and to which the R/W transducer 6 (see, e.g., FIG. 2) is to be rigidly fixed; and a transmission structure 36 interposed between the motor element 32 and the actuator element 34 to transmit a rotary movement of the motor element 32 to the actuator element 34 and then to the R/W transducer 6 fixed thereto. The microactuator 30 is symmetrical with respect to an axis A passing through centers of the motor element 32 and the actuator element 34.

In particular, the motor element 32 comprises an internal stator 38 integral with the die 31 and an external rotor 40 capacitively coupled to the stator 38 and connected to the actuator element 34 by the transmission structure 36.

The rotor 40 comprises a suspended mass 42 comprising an external annular region 44 externally delimiting the motor element 32, an internal circular region 46 arranged coaxially inside the external annular region 44, and two pairs of radial arms 48a, 48b connecting the external annular region 44 and the internal circular region 46. The radial arms 48a, 48b are suspended and are at a same angular distance from each other.

In particular, the two radial arms 48a, which are reciprocally aligned, project beyond the external annular region 44 between stop regions 49, and have the function of preventing excessive rotations of the rotor 40 which could cause a short-circuit between the rotor 40 and the stator 38.

The rotor 40 further comprises a plurality of movable arms 52 extending radially from the external annular region 44 towards and near the internal circular region 46 of the suspended mass 42. Each movable arm 52 has a plurality of extended projections defining movable electrodes 54 that are all arranged on the same side of the respective movable arm 52, are spaced at a same distance from each other along the movable arm 52, and extend in a substantially circumferential direction.

The internal circular region 46 further has a through-opening 56, substantially of a cross shape, coaxial to the internal circular region 46. Four anchoring and elastic suspension elements 58 are arranged inside the internal circular region 46 and elastically connect the internal circular region 46 to a fixed anchoring region 60 arranged in the center of the through-opening 56.

The stator 38 comprises four sector regions 62, which are ring-shaped and arranged between the internal circular region 46 of the suspended mass 42 and free ends of the movable arms 52. Each sector region 62 extends between a respective pair of adjacent radial arms 48a, 48b. The stator 38 further comprises a plurality of fixed arms 64 extending radially from the sector regions 62 towards the external annular region 44 of the suspended mass 42. Each fixed arm 64 is disposed facing a respective movable arm 52. Each fixed arm 64 has a plurality of extended projections defining fixed electrodes 66, all extending towards the respective movable arm 52 in a substantially circumferential direction and intercalated or interleaved with the movable electrodes 54 of the respective movable arm 52.

The actuator element 34 comprises a suspended mass 70 of a substantially circular shape, with a central opening 72 having a substantially cross shape and coaxial with the suspended mass 70. Four anchoring and elastic suspension elements 74 are arranged in the central opening 72 and elastically connect the suspended mass 70 to a fixed anchoring region 76 arranged centrally to the central opening 72.

The external annular region 44, internal circular region 46, radial arms 48a, 48b of the rotor 40, part of the fixed arms 64 and of the movable arms 52, as well as the suspended mass 70 of the actuator element 34 have a plurality of through-holes 78, only some of which are shown in the drawings for sake of simplicity in the illustration. The purpose of the through-holes 78 is to allow removal of a sacrificial layer (not shown) during fabrication of the microactuator 30.

In FIG. 4, the transmission structure 36 comprises first and second transmission arms 80, 81 identical to each other, extending between the motor element 32 and the actuator element 34 and disposed symmetrically on opposite sides of the axis A. The first and second transmission arms 80, 81 connect the external annular region 44 of the rotor 40, approximately from a location of the two radial arms 48a, to two diametrically opposed regions 84 of the suspended mass 70.

The microactuator 30 has the following suitable dimensions: the motor element 32 has a diameter comprised between 1.6 and 1.8 mm, the actuator element 34 has a diameter comprised between 0.7 and 0.9 mm, a distance between the motor element 32 and the actuator element 34 is comprised between 0.2 and 0.4 mm, and a width of the transmission arms 80, 81 is comprised between 50 and 100 µm.

The first and second transmission arms 80, 81 transmit a rotary movement of the rotor 40 to the actuator element 34 and then to the RJW transducer 6 rigidly connected thereto. In particular, the actuator element 34 herein rotates in the same direction as the rotor 40.

Figure 5:
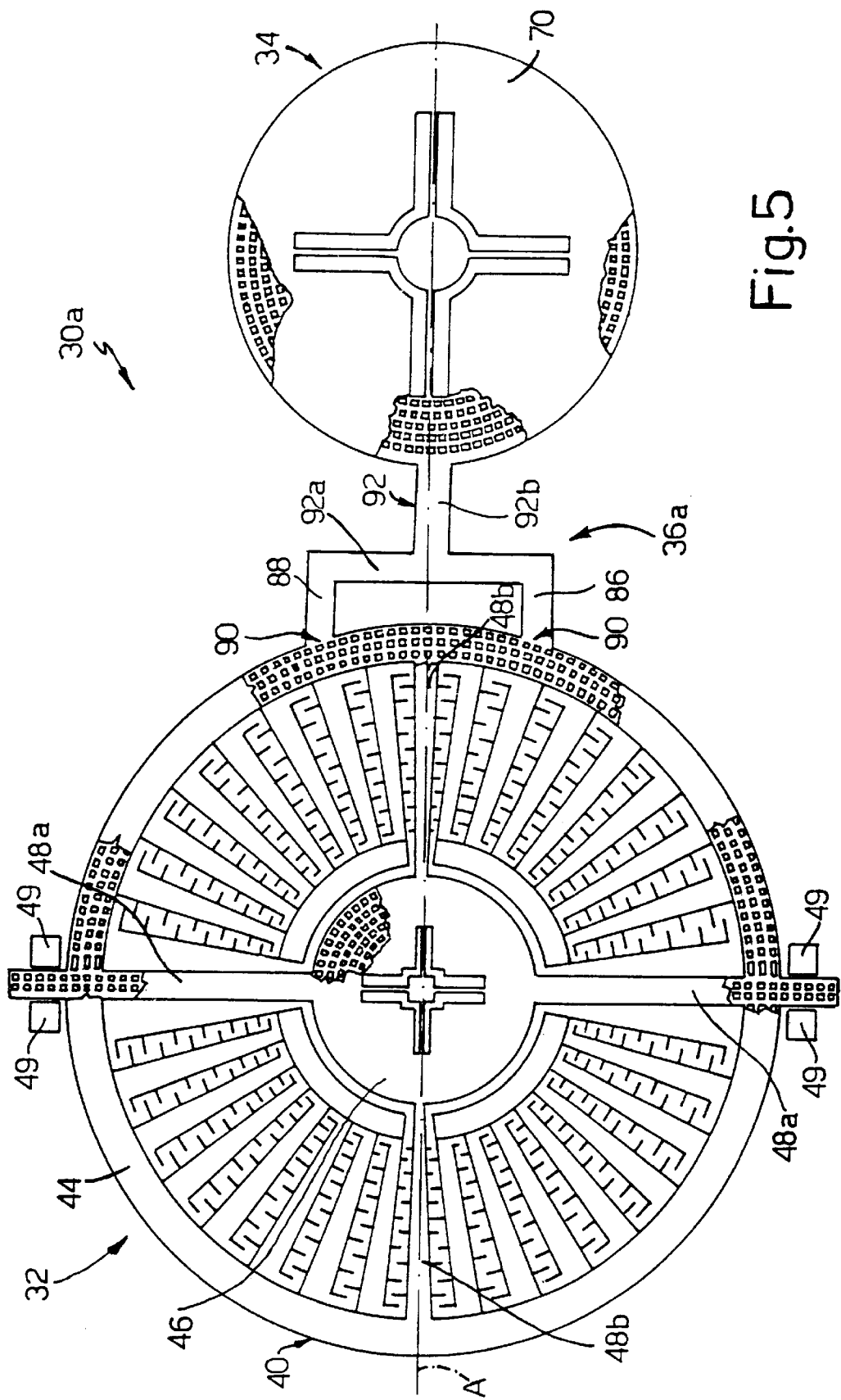
FIG. 5 is a schematic view of an integrated microactuator according to a second embodiment of the present invention.

FIG. 5 shows a microactuator 30a according to a second embodiment of the present invention. The microactuator 30a comprises the motor element 32 and the actuator element 34 identical to those of the microactuator 30 shown in FIG. 4 and described above, and therefore, are denoted by the same reference numerals, and a transmission structure 36a of a fork shape. In detail, the transmission structure 36a comprises first and second transmission arms 86, 88 which are rectilinear and parallel to each other, and a T-shaped third transmission arm 92. The first and second transmission arms 86, 88 are arranged symmetrically with respect to the axis A and extend towards the actuator element 34 from adjacent sections 90 of the external annular region 44 of the rotor 40. The third transmission arm 92 comprises a first portion 92a extending between the first and second transmission arms 86, 88, perpendicular thereto, and a second portion 92b extending along the axis A and connecting the first portion 92a to the suspended mass 70 of the actuator element 34.

With the second embodiment of FIG. 5, the actuator element 34 rotates in an opposite direction with respect to the rotor 40. In the microactuator 30a of FIG. 5, the fork-shape of the transmission structure 36a permits a release of stresses in the microactuator 30a which are caused, for example, by a difference between a manufacturing temperature of a layer forming the microactuator 30a and an operative temperature of the microactuator 30a.

Figure 6:
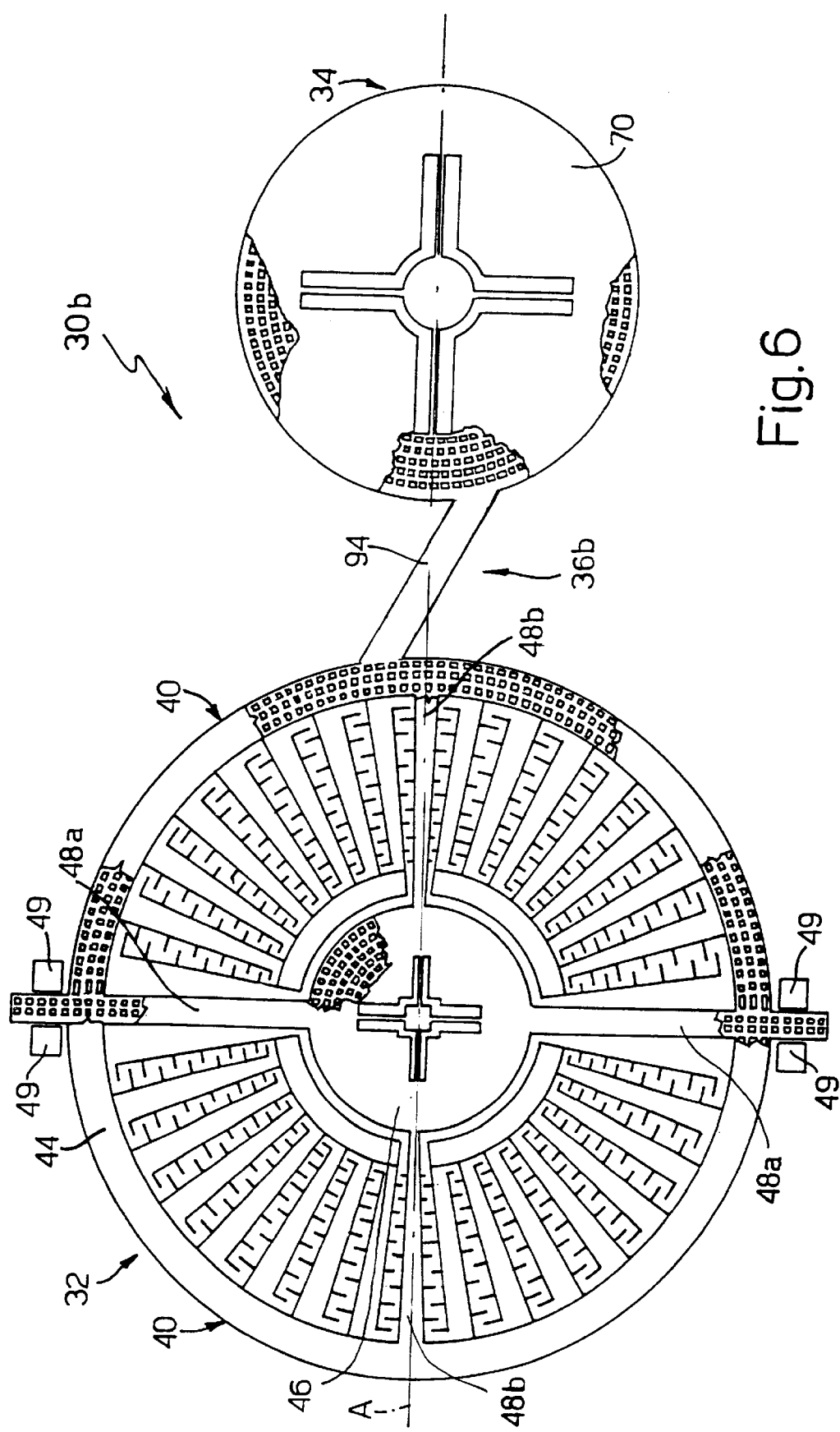
FIG. 6 is a schematic view of an integrated microactuator according to a third embodiment of the present invention.

FIG. 6 shows a microactuator 30b according to a third embodiment of the present invention. The microactuator 30b comprises the motor element 32 and the actuator element 34 identical to those of the microactuator 30 shown in FIG. 4 and described above, and a transmission structure 36b. The transmission structure 36b comprises a transmission arm 94 connecting the external annular region 44 of the rotor 40 to the suspended mass 70 of the actuator element 34 and extending in an inclined direction with respect to the axis A.

In the microactuator 30b of FIG. 6, the inclined shape of the transmission arm 94 allows an equal movement of all points of a cross section of the transmission arm 94 during actuation (which is different from the embodiments of FIGS. 4 and 5, wherein various points of a cross section of the transmission arms 80, 81 and 86, 88, or 92 are subject to different stresses and are thus subject to different movements, thereby causing a deformation of the transmission arms). In this way, there is a more efficient transmission of movement from the motor element 32 to the actuator element 34. Also for the third embodiment of FIG. 6, the actuator element 34 rotates in an opposite direction with respect to the rotor 40.

Figure 7:
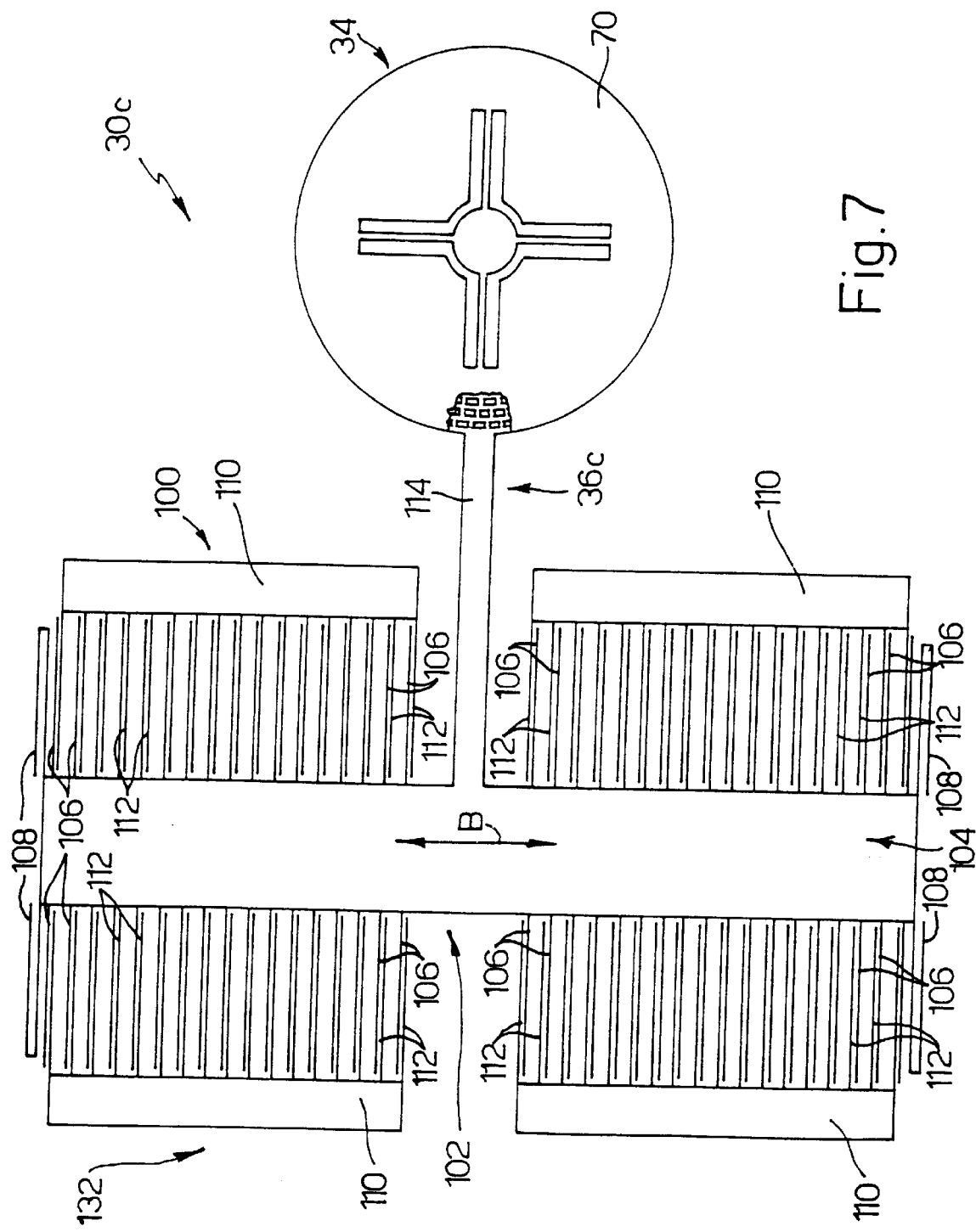
FIG. 7 is a schematic view of an integrated microactuator according to a fourth embodiment of the present invention.

FIG. 7 shows a microactuator 30c according to a fourth embodiment of the present invention. The microactuator 30c comprises a motor element 132 of a linear type, the actuator element 34 identical to the actuator elements of microactuator devices 30, 30a and 30b shown in FIGS. 4–6 and described above, and therefore denoted by the same reference numeral, and a transmission structure 36c interposed between the motor element 132 and the actuator element 34 to transform a linear movement of motor element 132 into a corresponding rotary movement of actuator element 34. In particular, the motor element 132 comprises a stator 100 and a rotor 102 capacitively coupled to the stator 100 and connected to the actuator element 34 by the transmission structure 36c.

The rotor 102 comprises a suspended mass 104 of a rectangular shape and a plurality of movable arms 106 extending from the suspended mass 104, perpendicular to larger sides of the suspended mass 104. In the example shown in FIG. 7, the movable arms 106 define four groups of movable arms which are identical to each other and are disposed in pairs on respective larger sides of the suspended mass 104. The rotor 102 further comprises anchoring and elastic suspension elements 108 extending from two opposite ends of the suspended mass 104 and having the function of supporting and biasing the rotor 102.

The stator 100 comprises four fixed regions 110 of a rectangular shape, parallel to the suspended mass 104, each of which are arranged facing a respective group of movable arms 106 and having a plurality of fixed arms 112. The fixed arms 112 extend perpendicular to the larger sides of the respective fixed region 110 and are each disposed facing a respective movable arm 106.

The transmission structure 36c comprises a transmission arm 114 extending between two groups of movable arms 106, and centrally and perpendicularly arranged with respect to the suspended mass 104.

When suitable potential differences are applied between the rotor 102 and the stator 100, the rotor 102 performs an alternating linear movement in the direction of an arrow B.

The transmission arm 114, integral with both the motor element 132 and the actuator element 34, which may only perform a rotary movement, thus transforms the alternating linear movement of the rotor 102 into an alternating rotary movement of actuator element 34 by virtue of elasticity that allows necessary small deformations of the transmission arm 114. Consequently, the RIW transducer 6, rigidly fixed to the actuator element 34, performs a rotary movement as in the preceding embodiments described above.

Figure 8:
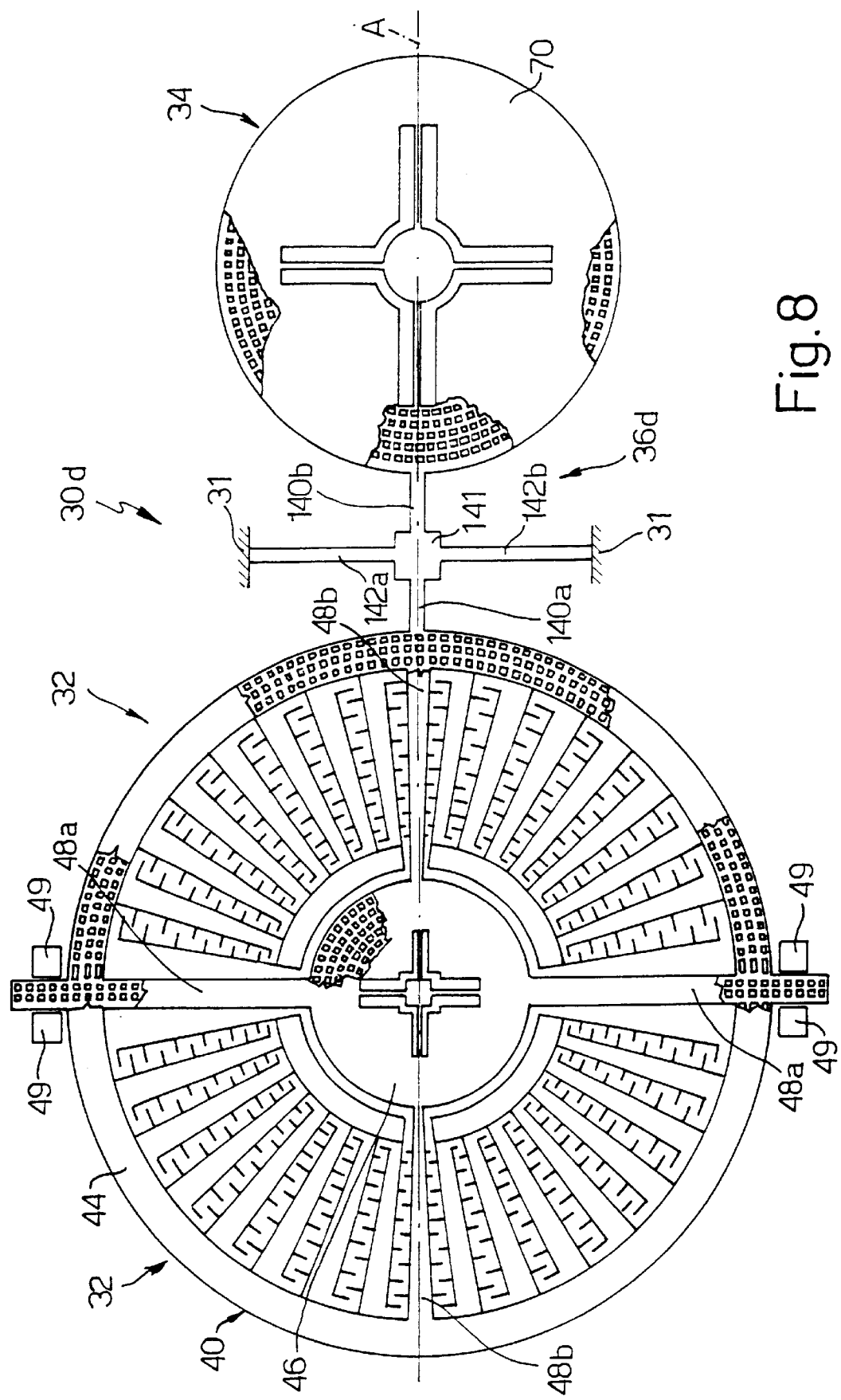
FIG. 8 is a schematic view of an integrated microactuator according to a fifth embodiment of the present invention.

FIG. 8 shows a microactuator 30d according to a fifth embodiment of the present invention. The microactuator 30d is of a rotary type and comprises the motor element 32 and the actuator element 34 identical to those of the microactuator 30 shown in FIG. 4 and described above, and a transmission structure 36d. The transmission structure 36d comprises first and second transmission arms 140a, 140b extending in a mutually aligned manner along the axis A. The first and second transmission arms 140a, 140b are connected by a hinge portion 141, which in turn is connected to the die 31 via two sections 142a, 142b perpendicular to the transmission arms 140a, 140b.

The transmission arms 140a, 140b and the sections 142a, 142b are thinner than the transmission arms 80, 81, 86, 88, 92, 94 and 114. For example, a width of the transmission arms 140a, 140b is comprised between 5 and 15 μm (preferably equal to 10 μm), and a length of each section 142a, 142b may be equal to two to four times that of each transmission arm 140a, 140b (and therefore comprised between 0.2 and 0.8 mm). In the fifth embodiment of FIG. 8, the actuator element 34 rotates in the same direction as the rotor 40.

In the microactuator 30d of FIG. 8, the particularly reduced width of the transmission arms 140a, 140b ensures that the transmission arms 140a, 140b undergo substantially uniform stresses along cross sections and so all points belonging to a same cross section undergo equal movements. In this way, deformation energy associated with operation of the microactuator 30d is reduced, and there is improved transmission efficiency. Furthermore, the presence of anchorages (e.g., the die 31) at the ends of the sections 142a, 142b allows for better support of all suspended structures (e.g., the rotor 40, actuator element 34, and transmission structure 36d) otherwise supported solely at the fixed anchoring regions 60 and 76.

Advantages afforded by the above-described microactuator devices include the following. First, a physical separation between the motor elements 32, 132 and the R/W transducer 6 causes a considerable reduction of mechanical stresses applied to the motor elements 32, 132 during impacts of the R/W transducer 6 on the hard disk 7, thereby increasing the microactuator device's general insensitivity to mechanical stresses. Furthermore, electrostatic interference caused by high biasing voltages of the motor elements 32, 132 on the R/W transducer 6 is also considerably reduced.

The physical separation between the motor elements 32, 132 and the RAW transducer 6 permits sealing of the motor elements 32, 132 for protection from both contaminating particles present in the atmosphere or generated during operation of the microactuator 30 and from particles generated during cutting of a semiconductor wafer accommodating the microactuator 30.

Furthermore, the present invention allows movement generation to be separated from actuation of the R/W transducer 6, thereby allowing these phases and related structures to be optimized independently of each other.

Also, it will be clear that modifications and variants may be introduced to the microactuators 30, 30a, 30b and 30c described and illustrated herein without thereby departing from the scope of the present invention. While specific embodiments of, and examples for, the invention are described herein for illustrative purposes in reference to microactuators for read/write transducers for hard disks, it is to be appreciated that principles of the invention are applicable to other devices. Consequently, the invention is not limited by the disclosure, but instead, the scope of the invention is to be determined entirely by the claims that follow.

What is claimed is:

1. An integrated microactuator, comprising:
   a motor including a stator element and a rotor element coupled reciprocally thereto, the rotor element including a fixed support structure and plural rotor arms movably connected to the support structure and movable in a plane;

a separate actuator element spaced laterally from the motor; and a transmission structure extending outwardly from said motor to said actuator element to transmit a movement of said motor into a corresponding movement of said actuator element.

2. The microactuator according to claim 1 wherein said actuator element is arranged adjacently to said motor and wherein said transmission structure comprises at least one connection element extending between said motor and said actuator element.

3. The microactuator according to claim 1 wherein said motor and said actuator element have a circular structure and wherein said transmission structure comprises first and second transmission arms extending between said motor and said actuator element and arranged on opposite sides with respect to a symmetry axis of said microactuator.

4. The microactuator according to claim 3 wherein said first and second transmission arms are arranged symmetrically on opposite sides with respect to said axis.

5. The microactuator according to claim 3 wherein said first and second transmission arms connect approximately diametrically opposed portions of a peripheral region of said rotor element substantially diametrically opposed regions of said actuator element.

6. The microactuator according to claim 1 wherein said motor element and said actuator element have a circular structure and wherein said transmission structure comprises:
    a transmission arm extending between said motor element and said actuator element in an inclined direction with respect to a symmetry axis of said microactuator.

7. The microactuator according to claim 1 wherein said actuator element has a circular structure and said motor element is of a linear type, wherein said rotor element comprises a suspended mass of a substantially elongated shape, and wherein said transmission structure comprises a transmission arm extending between said suspended mass and said actuator element in a direction transverse to said suspended mass.

8. The microactuator according to claim 7 wherein said transmission arm extends between a central zone of said suspended mass and a peripheral zone of said actuator element in a direction perpendicular to said suspended mass.

9. The microactuator according to claim 1 wherein said motor element and said actuator element have a circular structure and wherein said transmission structure comprises first and second transmission arms extending in a mutually aligned manner along a symmetry axis and joined by a hinge portion, wherein the hinge portion is connected to a fixed region of said microactuator through two sections substantially perpendicular to said first and second transmission arms.

10. An integrated microactuator, comprising:
    a motor element including a stator element and a rotor element coupled reciprocally thereto;
    a separate actuator element;
    a transmission structure interposed between said motor element and said actuator element to transmit a movement of said motor element into a corresponding movement of said actuator element;
    wherein said motor element and said actuator element have a circular structure and wherein said transmission structure comprises:
    first and second transmission arms extending towards said actuator element from said motor element and arranged on opposite sides with respect to a symmetry axis of said microactuator; and
    a third transmission arm having a T-shape and interposed between said first and second transmission arms and said actuator element.

11. The microactuator according to claim 10 wherein said first and second transmission arms are arranged symmetrically on opposite sides with respect to said symmetry axis, are parallel to each other, and extend from adjacent sections of a peripheral region of said rotor element.

12. The microactuator according to claim 10 wherein said third arm comprises:
    a first portion extending at right angles between said first and second transmission arms; and
    a second portion parallel to said first and second transmission arms, coaxial to said symmetry axis, and connecting said first portion to a peripheral zone of said actuator element.

13. A read/write system for a hard disk, the system comprising:
    a suspension device positionable over a region of the hard disk;
    an integrated microactuator connected to the suspension device, the microactuator comprising:
        a motor having a stator element capacitively coupled to a rotor element, wherein the rotor element moves with respect to the stator element if a voltage is applied to the motor, and the rotor element including a fixed support structure and plural rotor arms movably connected to the support structure and movable in a plane;
        an separate actuator element spaced laterally from the motor;
        a transmission structure extending outwardly from said motor to said actuator element to transmit a movement of the rotor element into a corresponding movement of the actuator element; and
    a read/write transducer operatively coupled to the actuator element, wherein the transducer moves over the region of the hard disk in response to the corresponding movement of the actuator element.

14. The system of claim 13 wherein the actuator element is arranged adjacently to the motor and wherein the transmission structure comprises a transmission arm connected to a peripheral region of the rotor element and to the actuator element.

15. The microactuator according to claim 13 wherein said motor and said actuator element have a circular structure and wherein said transmission structure comprises first and second transmission arms extending between said motor and said actuator element and arranged on opposite sides with respect to a symmetry axis of said microactuator.

16. The microactuator according to claim 15 wherein said first and second transmission arms are arranged symmetrically on opposite sides with respect to said axis.

17. The microactuator according to claim 15 wherein said first and second transmission arms connect approximately diametrically opposed portions of a peripheral region of said rotor element to substantially diametrically opposed regions of said actuator element.

18. The microactuator according to claim 13 wherein said motor and said actuator element have a circular structure and wherein said transmission structure comprises:
    first and second transmission arms extending towards said actuator element from said motor and arranged on opposite sides with respect to a symmetry axis of said microactuator; and a third transmission arm having a T-shape and interposed between said first and second transmission arms and said actuator element.

19. The microactuator according to claim 18 wherein said first and second transmission arms are arranged symmetrically on opposite sides with respect to said symmetry axis, are parallel to each other, and extend from adjacent sections of a peripheral region of said rotor element.

20. The microactuator according to claim 18 wherein said third arm comprises:

a first portion extending at right angles between said first and second transmission arms; and a second portion parallel to said first and second transmission arms, coaxial to said symmetry axis, and connecting said first portion to a peripheral zone of said actuator element.

21. A method of providing an integrated microactuator for a read/write transducer of a hard disk, the method comprising:

providing a motor having a rotor element and a stator element;

capacitively coupling the rotor element to the stator element, wherein the rotor element includes a fixed support structure and plural rotor arms movable connected to the support structure and movable in a plane;

positioning an separate actuator element spaced laterally from the motor;

connecting a transmission structure extending outwardly from said motor to said actuator element to transmit a movement of said motor into a corresponding movement of said actuator element; and using the transmission structure to transmit a movement of the rotor element into a corresponding movement of the actuator element.

22. The method of claim 21 wherein the connecting the transmission structure includes providing a transmission arm extending between the motor and the actuator element.

23. The method of claim 21, further comprising:

mounting the integrated microactuator to a suspension; and connecting the transducer to the actuator element.

24. The method of claim 21 wherein the connecting the transmission structure includes providing a pair of transmission arms extending between the motor and the actuator element and arranged on opposite sides with respect to a symmetry axis of the microactuator.

25. The method of claim 21 wherein the connecting the transmission structure includes connecting the transmission structure to a peripheral region of the rotor element.

26. The method of claim 21 further comprising applying a voltage to the motor to move the rotor element with respect to the stator element.

* * * * *